UNITED STATES PATENT OFFICE.

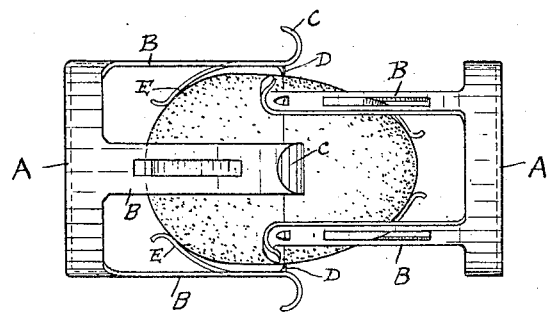
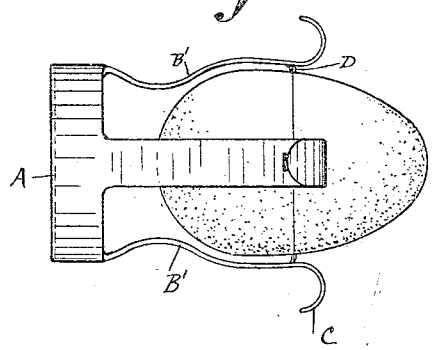
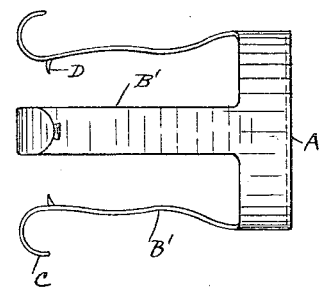

CHARLES H. SHELDON, OF KEWANEE, ILLINOIS.

EGG-OPENER.

944,827. Specification of Letters Patent. Patented Dec. 28, 1909.

Application filed December 26, 1908. Serial No. 469,224.

*To all whom it may concern:*

Be it known that I, CHARLES H. SHELDON, a citizen of the United States, residing at Kewanee, county of Henry, and State of Illinois, have invented new and useful Improvements in Egg-Openers, of which the following is a specification.

My invention relates to improvements in egg openers and holders. Heretofore, the devices of this class have, so far as I am aware, been formed in sections, which were hinged together and swung upon the hinged connection into a clamping position about the egg, prongs being provided for puncturing the shell.

The object of my invention is to provide a form of construction in which two coöperative egg engaging members may be adjusted independently of each other to eggs of any size and the shell punctured simultaneously on all sides along a single circumferential line of fracture, the members being adapted to support the respective halves of the egg shell in a position to retain the contents after the egg has been separated.

My invention also contemplates the provision of a form of construction in which the operation of the prongs in entering the egg may be observed and controlled by the operator.

A further object is to provide a form of construction in which each member may be formed or struck up integrally from a single piece of resilient sheet metal.

In the following description, reference is had to the accompanying drawings in which, Figure 1 is a view of my invention as it is applied to an egg. Fig. 2 illustrates one of the members, slightly modified in form, with an egg in position. Fig. 3 illustrates the counterpart member as it appears before being applied to the egg.

Like parts are identified by the same reference characters throughout the several views.

Referring to Fig. 1, it will be observed that the two members are substantially alike, each being provided with a base A and resilient prongs B, having their extremities turned outwardly and backwardly to form lips C. Near the lips C, the prongs are slitted and a portion of the metal turned inwardly and properly sharpened and pointed, thus forming cutters D, which are adapted to puncture the shell of the egg. Other portions of the prongs are preferably slitted and the material bent inwardly to form resilient arms E, which engage and support the ends of the egg and thus prevent it from slipping out of position when opened. The members are preferably formed of resilient sheet metal, the bases being cup shaped and the arms B formed integrally therewith, but an integral construction is not essential.

In use, the members are adjusted to the egg, as illustrated in Fig. 1, the arms of one member being in a position midway between the arms of the other member and the cutters of both members being in the same plane. By pressing inwardly upon the resilient arms B, the cutters are simultaneously forced through the shell of the egg, causing it to separate on an annular line of fracture. Each of the members will retain a portion of the egg shell and by quickly turning the members to a position with the prongs extending vertically the contents of each portion of the shell will be retained therein. The flat piece permits each member to rest upon a table or other support, whereby these shells are held in the proper position to retain the contents.

Referring to Figs. 2 and 3, it will be observed that the construction is substantially the same except that the prongs B′ are curved inwardly near the bases and then outwardly, so that near their lower ends they extend partially beneath the egg shell and prevent the half shell from dropping to the base when the shell is separated, thus enabling me to dispense with the inwardly projecting arms E illustrated in Fig. 1. The prongs are preferably four in number and the lips C are preferably provided as finger rests.

It will be observed that each base A is provided with a flat bottom and upwardly extending sides from the top of which the prongs extend. The base, therefore, constitutes a receptacle to receive any of the contents of the egg which may escape from the shell.

Having thus described my invention what I claim as new and desire to secure by Letters Patent is,

1. In a device of the described class, the combination of two open sided members, each formed integrally of thin sheet metal and having a flat base provided with an upwardly extending cylindrical wall and resilient prongs extending beyond the wall and provided intermediate of their ends with inwardly projecting cutters struck up from the metal of the prongs, the prongs of one member being adapted to pass between the arms of the other member.

2. In a device of the described class, the combination of two members each having a flat base and a set of resilient prongs provided with cutters intermediate of their ends struck up from the metal of said prongs, said prongs having portions thereof curved to embrace the ends of an egg and prevent the separate portions of the shell from dripping away from the cutters, and said prongs being also adapted to enter the space between the prongs of the other member.

In testimony whereof I affix my signature in the presence of two witnesses.

CHARLES H. SHELDON.

Witnesses:
ALBERT W. ERRETT, Jr.,
FORREST A. DICKINSON.